(12) United States Patent
Mans et al.

(10) Patent No.: US 11,309,767 B2
(45) Date of Patent: Apr. 19, 2022

(54) DRIVE UNIT FOR A DRUM MOTOR, DRUM MOTOR, REAR FLANGE AND PRODUCTION METHOD

(71) Applicant: INTERROLL HOLDING AG, Sant' Antonino (CH)

(72) Inventors: Erwin Mans, Waldfeucht-Haaren (DE); Jurriaen Van Holthe Tot Echten, BH Heerlen (NL)

(73) Assignee: INTERROLL HOLDING AG, Sant' Antonino (CH)

( * ) Notice: Subject to any disclaimer, the term of this patent is extended or adjusted under 35 U.S.C. 154(b) by 393 days.

(21) Appl. No.: 16/307,741

(22) PCT Filed: Jun. 27, 2017

(86) PCT No.: PCT/EP2017/065885
§ 371 (c)(1),
(2) Date: Mar. 22, 2019

(87) PCT Pub. No.: WO2018/002070
PCT Pub. Date: Jan. 4, 2018

(65) Prior Publication Data
US 2019/0305629 A1    Oct. 3, 2019

(30) Foreign Application Priority Data
Jun. 30, 2016   (DE) .......................... 102016112036.7

(51) Int. Cl.
*H02K 5/22* (2006.01)
*H02K 15/14* (2006.01)
(Continued)

(52) U.S. Cl.
CPC .............. *H02K 5/225* (2013.01); *H02K 5/04* (2013.01); *H02K 5/10* (2013.01); *H02K 7/116* (2013.01);
(Continued)

(58) Field of Classification Search
CPC ............ H02K 5/22; H02K 5/225; H02K 5/04; H02K 5/20; H02K 5/10; H02K 5/128;
(Continued)

(56) References Cited

U.S. PATENT DOCUMENTS 5,180,344 A    1/1993  Hall
5,442,248 A    8/1995  Agnoff
(Continued)

FOREIGN PATENT DOCUMENTS

| AT | 508662 | 3/2011 |
|---|---|---|
| AT | 13066 | 5/2013 |

(Continued)

OTHER PUBLICATIONS

Wang Piao, Electric Roller, Aug. 6, 2014, Wuxi Xinhua Shengdian Drum MFG Co., CN 203753848 (English Machine Translation) (Year: 2014).*

*Primary Examiner* — Quyen P Leung
*Assistant Examiner* — Alexander A Singh
(74) *Attorney, Agent, or Firm* — Price Heneveld LLP

(57) ABSTRACT

An electric drive unit comprises an electric drive device having a stator and a rotor, the stator and the rotor being disposed in a stator housing which extends along a longitudinal axis, a cable, wherein a first portion of the cable is connected to the drive device, and a liquid encapsulation is disposed on a second portion of the cable which has individual lines which are litz wires. A rear flange at an end side that faces away from an interior of the stator housing and has an annular space disposed on one end of the stator housing, wherein the liquid encapsulation is disposed in the annular space.

17 Claims, 7 Drawing Sheets

(51) Int. Cl.
*H02K 5/04* (2006.01)
*H02K 5/10* (2006.01)
*H02K 11/00* (2016.01)
*H02K 7/116* (2006.01)
*H02K 7/14* (2006.01)
*H02K 5/16* (2006.01)

(52) U.S. Cl.
CPC .............. *H02K 7/14* (2013.01); *H02K 11/00* (2013.01); *H02K 15/14* (2013.01); *H02K 5/161* (2013.01); *H02K 2207/03* (2013.01)

(58) Field of Classification Search
CPC .......... H02K 5/132; H02K 9/19; H02K 11/00; H02K 15/14; H02K 2207/03; H02K 7/116; H02K 7/14; H02K 5/161; B65G 23/08
USPC .......................................................... 310/71
See application file for complete search history.

(56) References Cited

U.S. PATENT DOCUMENTS

| | | | |
|---|---|---|---|
| 5,485,590 | A | 1/1996 | Hyatt et al. |
| 5,530,643 | A | 6/1996 | Hodorowski |
| 6,117,318 | A | 9/2000 | Simonelli |
| 6,124,656 | A | 9/2000 | Jensen |
| 6,200,036 | B1 | 3/2001 | Girardey |
| 6,240,335 | B1 | 5/2001 | Wehrung et al. |
| 6,244,427 | B1 | 6/2001 | Syverson |
| 6,633,278 | B1 | 10/2003 | Hoegener |
| 6,672,449 | B2 | 1/2004 | Nakamura et al. |
| 6,701,214 | B1 | 3/2004 | Wielebski et al. |
| 6,837,364 | B2 * | 1/2005 | Kanaris .................. B65G 23/08 198/782 |
| 7,207,433 | B2 | 4/2007 | Schaefer |
| 8,006,829 | B2 | 8/2011 | Itoh et al. |
| 8,381,901 | B2 | 2/2013 | Yamamoto |
| 8,757,363 | B2 | 6/2014 | Combs et al. |
| 9,284,131 | B2 * | 3/2016 | Kanaris .................. B65G 39/02 |
| 9,359,142 | B2 | 6/2016 | Jepsen |
| 9,618,056 | B2 * | 4/2017 | Itoh ........................... F16D 3/64 |
| 9,731,900 | B2 | 8/2017 | Ruggeri |
| 2002/0010527 | A1 | 1/2002 | Wielebski et al. |
| 2003/0168316 | A1 | 9/2003 | Knepple et al. |
| 2004/0144623 | A1 | 7/2004 | Newsom et al. |
| 2005/0083188 | A1 | 4/2005 | Choi |
| 2005/0162025 | A1 * | 7/2005 | Sivasubramaniam ... H02K 3/14 310/64 |
| 2006/0293782 | A1 | 12/2006 | Rees |
| 2007/0197072 | A1 | 8/2007 | Hvidberg et al. |
| 2008/0202042 | A1 | 8/2008 | Mesrobian et al. |
| 2008/0270427 | A1 | 10/2008 | Franke et al. |
| 2010/0322473 | A1 | 12/2010 | Taylor et al. |
| 2011/0062000 | A1 * | 3/2011 | Yamamoto ............. B65G 23/08 198/789 |
| 2012/0024669 | A1 | 2/2012 | Danelski et al. |
| 2012/0175223 | A1 | 7/2012 | Breen et al. |
| 2012/0175225 | A1 | 7/2012 | Breen et al. |
| 2012/0211330 | A1 | 8/2012 | Ziegler |
| 2012/0259436 | A1 | 10/2012 | Resurreccion et al. |
| 2012/0290126 | A1 | 11/2012 | Combs et al. |
| 2013/0076174 | A1 * | 3/2013 | Wibben .................. H02K 9/04 310/64 |
| 2013/0134017 | A1 | 5/2013 | Hall et al. |
| 2013/0190915 | A1 | 7/2013 | Choo et al. |
| 2014/0156063 | A1 | 6/2014 | Neiser et al. |
| 2014/0277698 | A1 | 9/2014 | Combs et al. |
| 2014/0326582 | A1 | 11/2014 | Sakaguchi |
| 2015/0068874 | A1 | 3/2015 | Jepsen et al. |
| 2015/0151921 | A1 | 6/2015 | Collot |
| 2016/0080526 | A1 | 3/2016 | Meyer-Graefe |
| 2016/0318714 | A1 | 11/2016 | Reischl |
| 2018/0009607 | A1 | 1/2018 | Tiedemann |

FOREIGN PATENT DOCUMENTS

| | | | |
|---|---|---|---|
| CN | 2033808 | U | 3/1989 |
| CN | 2199164 | Y | 5/1995 |
| CN | 102026894 | | 4/2011 |
| CN | 202704402 | | 1/2013 |
| CN | 203682423 | U | 7/2014 |
| CN | 203753848 | | 8/2014 |
| CN | 203753848 | A * | 8/2014 |
| CN | 105378313 | | 3/2016 |
| DE | 1978258 | | 2/1968 |
| DE | 3412786 | | 10/1985 |
| DE | 3538173 | | 1/1987 |
| DE | 4230729 | | 3/1993 |
| DE | 69306884 | | 5/1997 |
| DE | 19811130 | | 9/1999 |
| DE | 10044938 | A1 | 8/2001 |
| DE | 102006004421 | | 8/2006 |
| DE | 102006054575 | | 5/2008 |
| DE | 102006054575 | | 9/2008 |
| DE | 102008053557 | | 9/2009 |
| DE | 102008018205 | | 12/2009 |
| DE | 202008017534 | | 12/2009 |
| DE | 20200902821 | | 2/2011 |
| DE | 202009012822 | | 2/2011 |
| DE | 202012000793 | | 4/2012 |
| DE | 102010044027 | | 5/2012 |
| DE | 102011004802 | | 8/2012 |
| DE | 102011109531 | | 2/2013 |
| DE | 20201104485 | | 10/2015 |
| DE | 102015106026 | | 8/2016 |
| DE | 102015104130 | | 9/2016 |
| DE | 102015106034 | | 10/2016 |
| DE | 102015106024 | | 11/2016 |
| DE | 102015107167 | | 11/2016 |
| DE | 102015114030 | | 3/2017 |
| EP | 1021664 | | 7/2000 |
| EP | 1021664 | | 1/2002 |
| EP | 1454851 | | 9/2004 |
| EP | 1656312 | | 5/2006 |
| EP | 1675244 | | 6/2006 |
| EP | 2369211 | | 9/2011 |
| EP | 2455310 | | 5/2012 |
| EP | 3212543 | A1 | 9/2017 |
| JP | S5741821 | | 3/1982 |
| JP | S5890447 | | 5/1983 |
| JP | S59180609 | | 10/1984 |
| JP | S6015308 | | 1/1985 |
| JP | H05236612 | | 9/1993 |
| JP | 2003026603 | | 1/2003 |
| JP | 2003104534 | | 4/2003 |
| JP | 2004098554 | | 4/2004 |
| JP | 2014516895 | | 7/2014 |
| JP | 2014142740 | | 8/2014 |
| WO | 0203153 | | 1/2002 |
| WO | 02098768 | | 5/2002 |
| WO | 2010142029 | | 12/2010 |
| WO | 2011029120 | | 3/2011 |
| WO | 2009139068 | | 9/2011 |
| WO | 2012094690 | | 7/2012 |
| WO | 2012113922 | | 8/2012 |
| WO | 2012154650 | | 11/2012 |
| WO | 2013000006 | | 1/2013 |
| WO | 2013000006 | A2 | 1/2013 |
| WO | 2014011459 | | 1/2014 |
| WO | 2014057984 | | 4/2014 |
| WO | 2015157613 | | 10/2015 |
| WO | 2016066495 | A1 | 5/2016 |
| WO | 2016169982 | | 10/2016 |
| WO | 2016169986 | | 10/2016 |
| WO | 2016177906 | | 10/2016 |
| WO | 2014178399 | | 2/2017 |
| WO | 2018009607 | A1 | 1/2018 |

* cited by examiner

DRIVE UNIT FOR A DRUM MOTOR, DRUM MOTOR, REAR FLANGE AND PRODUCTION METHOD

CROSS-REFERENCE TO FOREIGN PRIORITY DOCUMENT

The present application claims the benefit under 35 U.S.C. §§ 119(b), 119(e), 120, and/or 365(c) of PCT/EP2017/065885 filed Jun. 27, 2017, which claims priority to German Application No. 102016112036.7 dated Jun. 30, 2016.

FIELD OF THE INVENTION

The disclosure relates to an electric drive unit for a drum motor, in particular, for a drum motor for conveyor systems for conveying containers, pallets, and the like, for example, in the foodstuff industry. The disclosure furthermore relates to a drum motor, to a rear flange for an electric drive unit of a drum motor, to a method for producing an electric drive unit for a drum motor, and to a method for producing a drum motor.

BACKGROUND OF THE INVENTION

Drum motors of the type mentioned at the outset and the drive units thereof are used in conveyor systems which, apart from drum motors, often also have conveyor rollers without an electric drive unit. Depending on the application, a conveyor belt, for example, a transportation belt, a plastic link belt, or a modular or module belt, respectively, is fitted to the drum motors and/or conveyor rollers. Alternatively, the transported goods can also bear directly on the drum motors and/or conveyor rollers. One or a plurality of conveyor rollers are set in rotation by a drive in order for the transported goods to be transported. To this end, the conveyor rollers have a drive unit, wherein such a conveyor roller having a drive unit can also be referred to as a drum motor. Conveyor rollers can also be set in rotation, for example, by a drive belt which is connected to a drive unit or a drum motor.

Conveyor rollers and drum motors having drive units are known, for example, from DE 10 2006 054 575 A1, EP 1 02 1664 B1, DE 20 2009 012 822 U1, DE 10 2015 104 130, or DE 10 2015 114 030 by the applicant.

Typical fields of application of conveyor systems that are driven by drum motors are, for example, postal distribution centers, the foodstuff processing industry, assembly lines in the electronics industry, machine chains in automation, production plants, shipping and packing lines, commissioning systems of pharmaceutical distributors, transportation of pallets in the beverage trade, cargo handling, or checkouts in supermarkets. In particular, for example, in the foodstuff processing industry where dairy products, fish, or meat are transported, drum motors must meet the high requirements in terms of hygiene for that sector, and withstand washing procedures using chemicals and hot water under high pressure. Drive systems with gear motors, such as drum motors, represent a potential source of contaminants in the processing of foodstuffs. Therefore, drum motors for the use in foodstuff processing have to be constructed and engineered such that the risk of contamination is reduced, this being a particular challenge in the case of compact drum motors having a short construction length in the direction of the longitudinal axis. At the same time, drum motors are to be economical and efficient.

SUMMARY OF THE INVENTION

It is, therefore, an object of the present disclosure to specify a drive unit for a drum motor, a drum motor, a rear flange, a method for producing an electric drive unit, and a method for producing a drum motor which improve existing solutions. It is an object of the present invention to provide a drive unit for a drum motor, a drum motor, a rear flange, a method for producing an electric drive unit, and a method for producing a drum motor, which enable a cost-effective and/or reliable solution, the latter in particular with a view to foodstuff safety. It is furthermore an object of the present invention to provide a drive unit for a drum motor, a drum motor, a rear flange, a method for producing an electric drive unit, and a method for producing a drum motor, which enable a particularly compact construction mode.

This object according to a first aspect of the disclosure is achieved by an electric drive unit for a drum motor, comprising an electric drive device having a stator and a rotor, the stator and the rotor being disposed in a stator housing which extends along a longitudinal axis; a cable, wherein a first portion of the cable is connected to the drive device, and a liquid encapsulation disposed on a second portion of the cable that has individual lines which are litz wires; wherein a rear flange which at an end side that faces away from an interior of the stator housing has an annular space disposed on one end of the stator housing; and wherein the liquid encapsulation is disposed in the annular space.

The stator housing in which the stator and the rotor are disposed preferably has a substantially cylindrical shape. In this way, a substantially cylindrical shape of the electric drive unit also results. Such a drive unit is typically disposed in the cavity of a preferably likewise substantially cylindrical drum tube of a drum motor. The drum tube of a drum motor, however, can in portions or across the entire axial length thereof also have a polygonal cross section. For example, the drum tube can be configured as a hexagonal hollow profile. A cylindrical shape of the drive unit also has advantages in the case of such a configuration of the drum tube. The drum tube of a drum motor and the electric drive unit, in particular, the drive device thereof, are preferably aligned so as to be coaxial such that longitudinal axes of the drum motor and/or of the drum tube and/or of the electric drive unit and/or of the drive device are preferably identical.

The electric drive unit for a drum motor, in particular, for a drum motor for conveyor systems for conveying products of the foodstuff industry, provides that a cable that is connected to the drive device by way of the liquid encapsulation of the cable is disposed in an annular space of the rear flange. A liquid encapsulation is disposed on the second portion of the cable, preferably at the transition from the first to the second portion of the cable. This has the advantage that oil from the drive device is prevented from making its way out of the drive unit through the cable and/or the drive motor into a working environment. Oil leakages from drive units of drum motors can cause great damage, especially in the foodstuff sector. The routing of a cable from a drive unit and/or a drive motor is, therefore, of particular relevance.

A liquid encapsulation, which can also be referred to as a "potting," serves for configuring a liquid barrier, in particular, an oil barrier. The liquid encapsulation thus serves for achieving a fluid-tight transition. To this end, a capillary liquid barrier is generated, in particular, in the second portion of the cable, preferably between the litz wires of the individual lines and between an insulation of the individual lines and a common jacket, and/or between an insulation and the individual lines. The liquid encapsulation is preferably disposed on the end of the second portion of the cable at which the second portion of the cable transitions to the first portion of the cable. The liquid encapsulation is preferably disposed at a transition between the first and second portion of the cable. The liquid encapsulation is, in particular, disposed in such a manner that a liquid barrier is achieved in relation to an interior of the drive device such that no liquids can ingress into the drive device through the cable, and no liquids, such as oil, can make their way from the drive device into the second portion of the cable.

A liquid encapsulation is preferably created by casting the transition between the first and second portion of the cable using an initially liquid substance or casting compound, respectively, which then cures. For example, bi-component thermally curing polymer systems (2K) which are based on, for instance, epoxy resins, polyurethanes, silicone, or acrylate, may be used as casting compounds. Single-component polymer systems (1K) which bond under UV light, for example, can also be used. In order for the liquid encapsulation to be produced, the transition between the first and second portion of the cable can be assembled, for example, in a mold (or the so-called pot), the mold subsequently being filled with the casting compound. The casting compound is subsequently cured so as to form the liquid encapsulation.

The liquid encapsulation of the cable can be configured so as to be tubular and/or have a substantially cylindrical external surface. The liquid encapsulation in the interior typically has a shape that corresponds to the transition from the first to the second portion of the cable, since the casting compound which when filling the mold is liquid has preferably completely enclosed the geometry.

The liquid encapsulation in the cured state is typically substantially flexurally rigid, that is to say, not or only insubstantially accessible to an elastic and/or plastic deformation, for example, by way of the hand of a user.

Said liquid encapsulation in the electric drive unit is disposed in an annular space that is disposed on the end side of the rear flange that faces away from an interior of the stator housing. A component which in a substantially axial direction at least partially closes an open end of the stator housing is typically referred to as a rear flange. A rear axle is typically routed through the rear flange. The annular space is preferably disposed so as to be radially outside of such a rear axle, or an opening that is provided in the rear flange for these cases. The annular space can be configured so as to be annular, in particular, completely encircling, or only as an annular segment. The annular space preferably represents an open or closed cavity, and can be configured, for example, as a depression or a groove in the end side of the rear flange. As will also be even further described hereunder, the annular space can also be configured so as to be closed, wherein a depression or a groove, for example, can be closed by a cover element.

Furthermore, preferably, not only the liquid encapsulation but also the end regions of the first and/or second portion of the cable that adjoin said liquid encapsulation are disposed in the annular space. The cable by way of at least one part of the first portion preferably lies in the annular space, the liquid encapsulation and at least one part of the second portion of the cable adjoining the former, said liquid encapsulation and said at least one part of the second portion preferably being likewise disposed in the annular space.

The disposal of the liquid encapsulation in the annular space has inter alia the advantage that a particularly compact construction mode is enabled in the axial direction of the drive unit and, thus, also of the drum motor. A liquid encapsulation in existing solutions is typically disposed such that the cable having the liquid encapsulation is disposed so as to be parallel with an axle that is routed out of the drive unit. However, in this way a minimal axial length is required for said disposal, said minimal axial length corresponding to at least the length in the direction of main extent of the liquid encapsulation. The space requirement necessary in the axial direction can be significantly reduced, in particular, substantially to the diameter of the liquid encapsulation, by way of the disposal of the liquid encapsulation according to the invention in an annular space.

The first portion of the cable preferably also has individual lines which are litz wires. The individual lines in the first portion and/or in the second portion of the cable can run in a mutually separate manner. The individual lines in the first portion and/or in the second portion of the cable can also run in a common jacket. The individual lines that run in a mutually separate manner in the first portion of the cable are preferably connected to corresponding individual lines of the drive device, for example, by crimping and/or soldering. The individual lines in the second portion of the cable, which are typically formed from litz wires surrounded by an insulation, preferably run in a common jacket, in particular, a jacket which, preferably in an insulating manner, surrounds all of the individual lines.

The liquid encapsulation by way of the direction of main extent thereof is preferably disposed so as to be substantially orthogonal to the longitudinal axis of the stator housing. It is furthermore preferable for a direction of main extent of the liquid encapsulation to extend substantially parallel with the end side of the rear flange. The end side of the rear flange preferably extends so as to be substantially orthogonal to the longitudinal axis of the stator housing. The rear flange on the end side thereof can have depressions and/or elevations. A substantial extent of the end side of the rear flange however preferably runs so as to be substantially orthogonal to the longitudinal axis of the stator housing since the rear flange at least partially closes the drive unit in an axial direction.

In one further preferred design embodiment it is provided that the liquid encapsulation is substantially completely disposed within the annular space. In a drum motor, in particular, a drum motor having a short, compact axial length, a head element is typically attached to an open end of the drum tube, said head element closing the drum tube having the drive unit disposed therein. An inner end side, or at least a region of the inner end side, of the head element, in particular, in the case of the short axial length of the drum motor, is thus contiguous to an outer end side of the rear flange (that is to say, the end side of the rear flange that faces away from the rotor and stator), or is at least not spaced far apart axially from said outer end side of the rear flange. Contact between the rear flange and the head element, in particular, on account of elements that unintentionally project from the rear flange in the axial direction, is undesirable, in particular, on account of a rotation of the rear flange relative to the head element when driving the drum motor. On account of the liquid encapsulation being substantially completely disposed within the annular space, it can be advantageously prevented or at least minimized that the liquid encapsulation partially projects from the annular space in the axial direction and undesirably comes into contact with the head element.

In one further preferred embodiment it is provided that a direction of main extent of the liquid encapsulation in a central region of the liquid encapsulation runs so as to be substantially tangential in relation to the annular space. The annular space preferably has a circumferential direction which, in the radial direction, preferably runs so as to be substantially centric within the annular space. The liquid encapsulation is preferably disposed in the annular space in such a manner that a direction of main extent of the liquid encapsulation runs so as to be substantially tangential to said circumferential direction of the annular space. This tangential profile of the direction of main extent of the liquid encapsulation preferably relates to a region of the liquid encapsulation that is central in the direction of main extent, since the two ends of the liquid encapsulation, by virtue of the length of the liquid encapsulation, deviate more from such a tangential alignment than the center of the liquid encapsulation in the direction of main extent.

It is furthermore preferable for the annular space in the radial and/or the axial direction to have an extent that is larger than the diameter of the liquid encapsulation, preferably larger by at least or at most 10%, or larger by at least or at most 20%, or larger by at least or at most 25%, or larger by at least or at most 30%, or larger by at least or at most 40%, or larger by at least or at most 50%, or larger by at least or at most 60%, or larger by at least or at most 70%, or larger by at least or at most 80%, or larger by at least or at most 90%, or larger by at least or at most 100%.

One further preferred refinement provides that the annular space is delimited by an outer wall of the rear flange, in particular, a radially and/or axially outer wall of a main body of the rear flange. For example, in this design embodiment, a preferably radially and/or axially outer wall of the rear flange can protrude in the axial direction beyond the end side of the rear flange and, thus, form an outer wall which delimits the annular space in a radially outward manner.

It is furthermore preferable for the annular space to be configured as a groove that is open at the end side. Such an open groove can be formed, for example, on the radial outer side thereof by an outer wall of the rear flange, as has been described above. The base face of the groove can be formed, for example, by a region of the end face of the rear flange that is recessed in relation to the outer wall. A radially inner wall of the groove can be formed, for example, by an in particular radially inner wall of the rear flange, said radially inner wall protruding in the axial direction beyond the end face of the rear flange.

It can furthermore be preferable for the annular space to be delimited by a cover element. A delimitation of the annular space in the axial direction, in particular, toward an end which in the installed state faces the head element of a drum motor, is particularly preferable.

The cover element preferably closes at least in portions the groove of the rear flange of the main body of the rear flange, said groove being open at the end side. In particular, a design embodiment in which a groove that is open at the end side, specifically, a groove which in the axial direction is open toward a side that in the installed state faces the head element of a drum motor, is covered by a cover element in a substantially axial direction is particularly also preferable. Such a design embodiment has the advantage that the cable having the liquid encapsulation can be placed in the annular space in the axial direction, and the annular space after the placing of the cable having the liquid encapsulation can be closed by the cover element. In this way, the liquid encapsulation and the regions of the cable contiguous thereto can be advantageously prevented from coming into undesirable contact with a head element of a drum motor.

The cover element can be configured to be closed across the full area or to be open in portions. For example, the cover element can have a mesh and/or net and/or lattice structure.

The cover element is preferably connected to the rear flange, in particular, a main body of the rear flange, by way of a releasable or a non-releasable connection. For example, the connection can be configured as a form-fitting and/or materially integral and/or force-fitting connection. Further and more preferably, the connection can be configured as a snap-fit and/or latch-fit and/or clip-fit connection.

The rear flange is preferably composed of metal and/or plastics material, or comprises metal and/or plastics material. The cover element is preferably composed of plastics material or comprises plastics material.

It is particularly preferable for an outer wall that delimits the annular space in a radially outward manner to be configured from metal or to comprise metal, this advantageously leads to a high stability. A configuration of the cover element from plastics material can contribute toward a cost-effective solution.

It is further and more preferably provided that the drive unit comprises a rear axle that is connected to the rear flange. The cable preferably runs through an interior of the rear axle and furthermore preferably in the axial direction exits the rear axle at an open end.

It can be furthermore provided that the rear axle is connected to the rear flange by way of an intermediate tube. The cable preferably runs through an interior of the intermediate tube and, more preferably, in the axial direction exits the intermediate tube at an open end of the latter. The intermediate tube preferably has a radial opening, preferably on that end thereof that faces the drive device. The radial opening preferably opens into the region of the annular space. The cable preferably runs out of the annular space through the radial opening of the intermediate tube into the interior of the intermediate tube, and more preferably from there into the interior of the rear axle.

A preferred cable routing in which the cable is advantageously routed from the drive device through the annular space into an interior of the intermediate tube and/or of the rear axle, and exits axially at an open end of the rear axle is described by way of said design embodiments.

According to a further aspect of the invention, the object mentioned at the outset is achieved by a drum motor comprising a drum tube having a cavity configured therein and a longitudinal axis, and by an electric drive unit that is disposed in the cavity of the drum tube as described above.

The drum motor preferably has a head element which by way of an introduction portion is introduced into a hollow end of the drum tube. It is more preferably provided that the head element, in particular, a radially outer wall of the head element, at least in portions overlaps the annular space of the rear flange, in particular the cover element of the rear flange, in the direction of the longitudinal axis of the stator housing.

It is provided in this embodiment that there is an overlap region in the axial direction, in which overlap region the head element and the rear flange are disposed in an overlapping manner. It is particularly preferable for a radially outer wall of the head element to at least in portions overlap a cover element that in relation to the wall of the head element is preferably disposed so as to be radially further inward. A particularly compact and stable construction can be achieved on account thereof.

According to a further aspect of the invention, the object mentioned at the outset is achieved by a rear flange for an electric drive unit of a drum motor, in particular, for an electric drive unit described above, the rear flange comprising an annular space, which is disposed on an end side that in the operating state faces away from an interior of the stator housing and which is disposed and configured for receiving a liquid encapsulation of a cable that is connected to a drive device, wherein a first portion of the cable is connected to the drive device, and the liquid encapsulation is disposed on a second portion of the cable that has individual lines which are litz wires.

In terms of advantages, variants of embodiments, and details of embodiments of these further aspects of the invention and the potential refinements thereof, reference is made to the preceding description pertaining to the respective features of the drive unit.

According to a further aspect of the invention, the object mentioned at the outset is achieved by a method for producing an electric drive unit for a drum motor, in particular, an electric drive unit described above, comprising the following method steps: providing an electric drive device having a stator and a rotor, said stator and said rotor being disposed in a stator housing which extends along a longitudinal axis, wherein a rear flange which at an end side that faces away from an interior of the stator housing has an annular space is disposed on one end of the stator housing; connecting a first portion of a cable to the drive device, wherein a liquid encapsulation is disposed on a second portion of the cable which has the individual lines which are litz wires; disposing the liquid encapsulation in the annular space.

The method for producing an electric drive unit can preferably be refined by connecting the individual lines to the drive device by crimping and/or soldering.

According to a further aspect of the invention, the object mentioned at the outset is achieved by a method for producing a drum motor, in particular, a drum motor described above, comprising the following method steps: providing a drum tube having a cavity configured therein and a longitudinal axis; disposing an electric drive unit described above in the cavity of the drum tube.

The method for producing a drum motor can preferably be refined by introducing a head element by way of an introduction portion into a hollow end of the drum tube.

The methods according to the invention and the potential refinements thereof have features or method steps, respectively, which render said methods particularly suitable for producing the above described devices and the respective refinements thereof.

In terms of advantages, variants of embodiments, and details of embodiments of these further method aspects of the invention and the potential refinements thereof, reference is made to the preceding description pertaining to the respective device features.

BRIEF DESCRIPTION OF THE DRAWINGS

Preferred embodiments of the invention will be described in an exemplary manner by means of the appended figures in which.

DETAILED DESCRIPTION OF THE EMBODIMENTS

Figure 1:
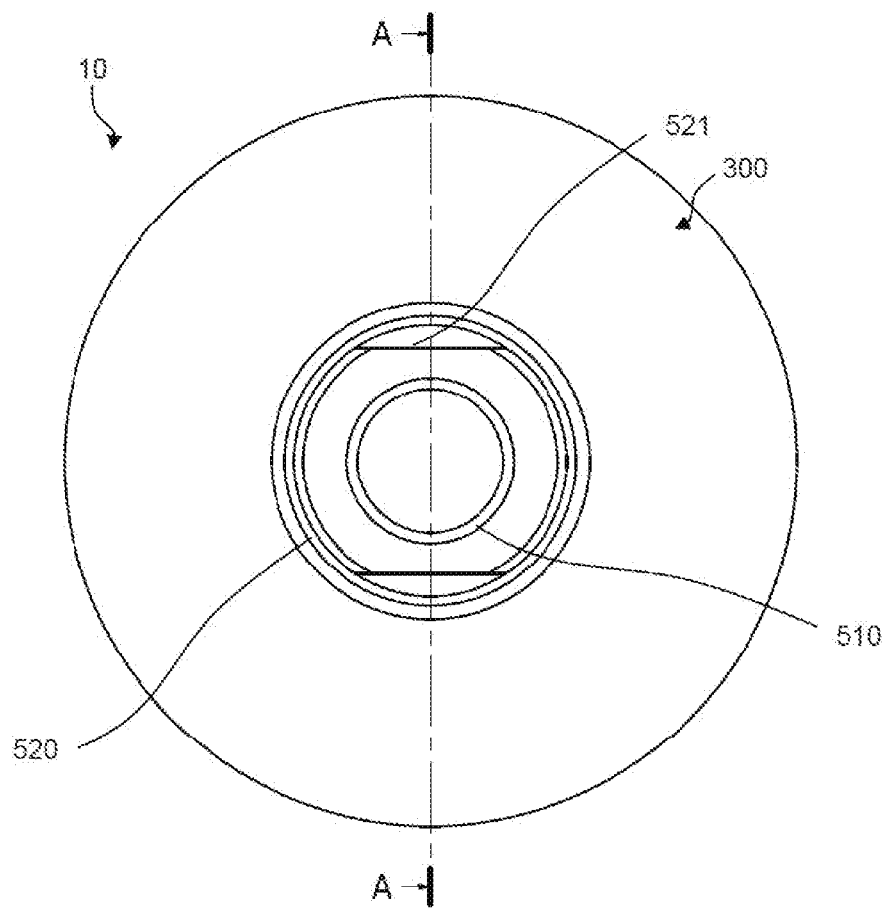
FIG. 1 is a front view of an exemplary embodiment of a rear flange according to the invention, having a head element.
Figure 2:
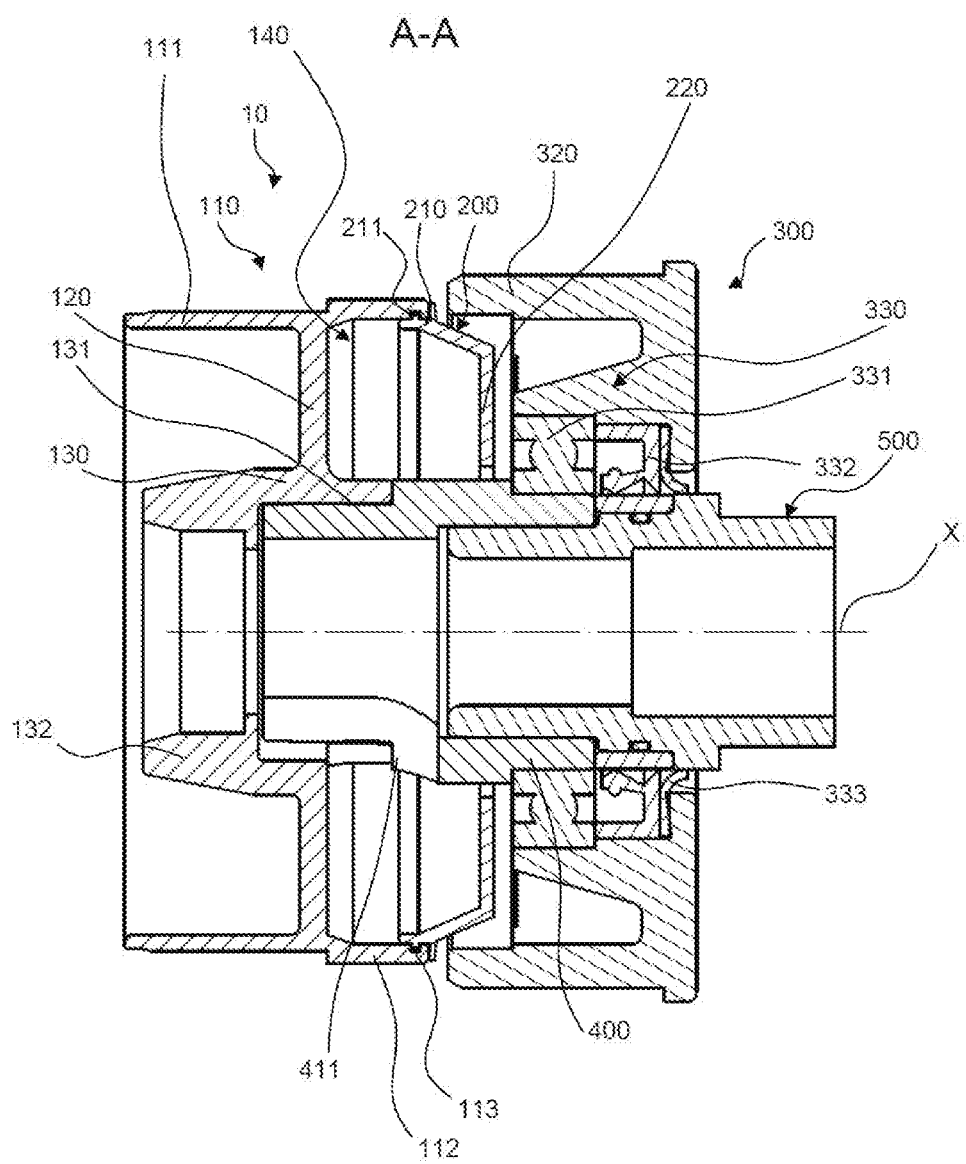
FIG. 2 is a longitudinal section along the section plane A-A according to FIG. 1.
Figure 3:
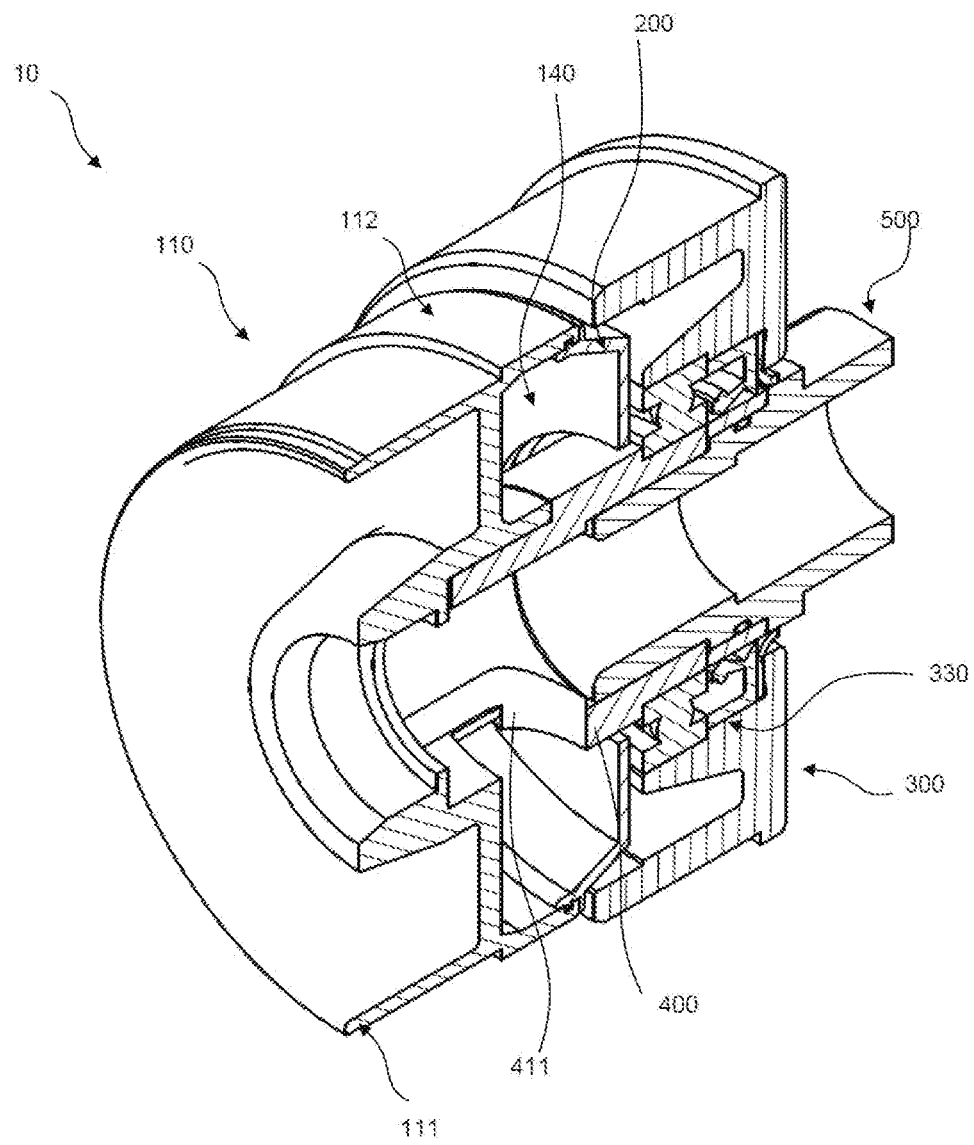
FIG. 3 is the longitudinal section according to FIG. 2 in a three-dimensional view.
Figure 4:
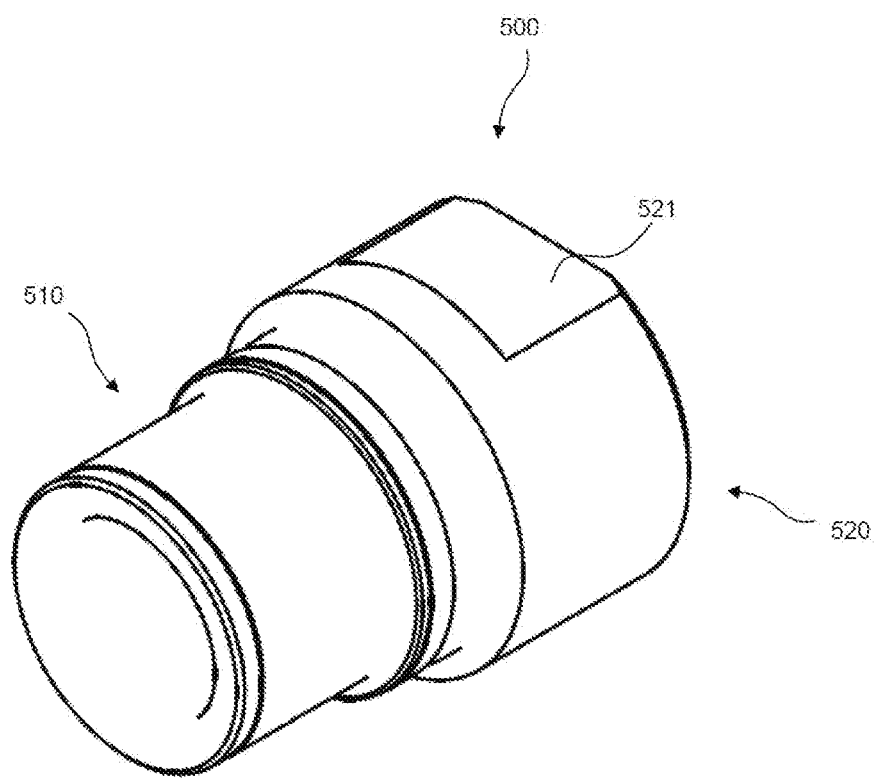
FIG. 4 is the rear axle of the rear flange according to FIGS. 1 to 3 in a three-dimensional view.
Figure 5:
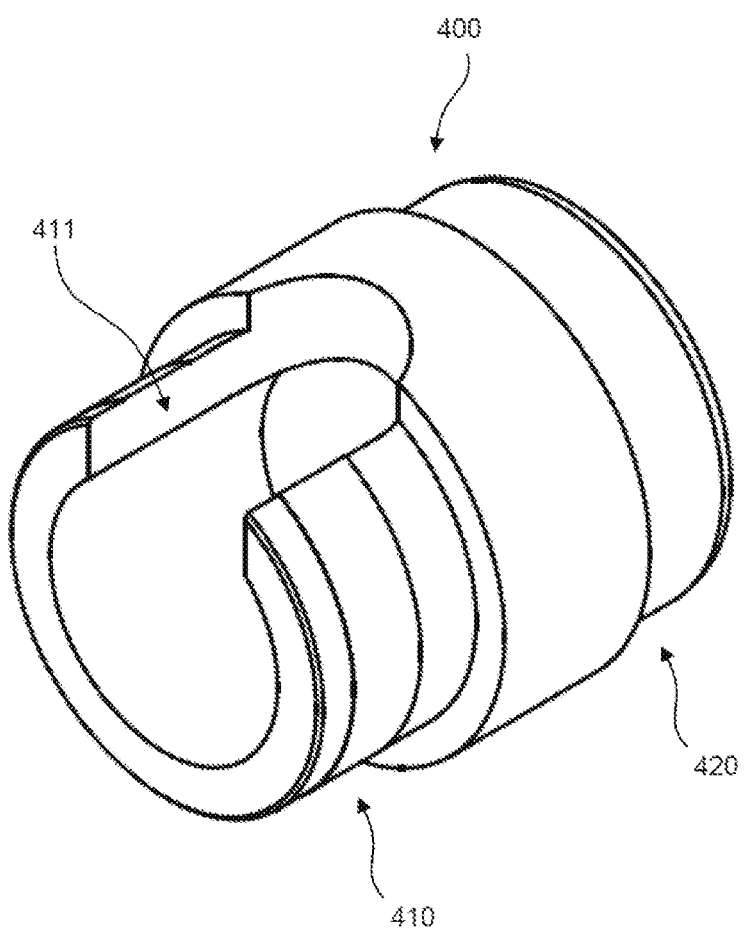
FIG. 5 is the intermediate tube of the rear flange according to FIGS. 1 to 3 in a three-dimensional view.
Figure 6:
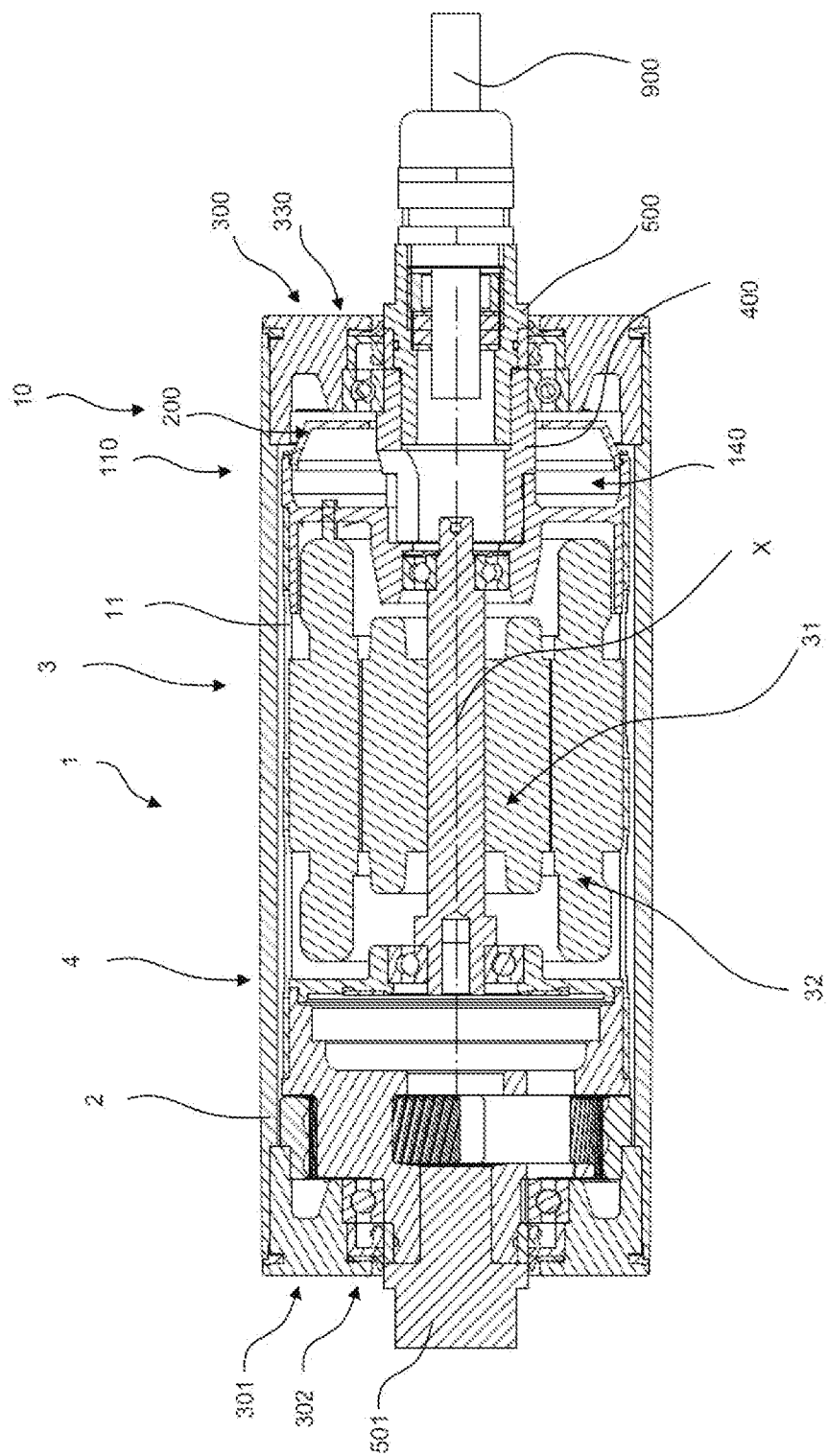
FIG. 6 is an exemplary embodiment of a drum motor according to the invention, having a rear flange and a head element according to FIGS. 1 to 5.

An exemplary embodiment of a rear flange 10 according to the invention, having a head element 300 is illustrated in FIGS. 1 to 3. The rear axle 500 and the intermediate tube 400 of the rear flange 10 of FIGS. 1 to 3 are illustrated separately in a three-dimensional manner in FIGS. 4 and 5. FIG. 6 shows the rear flange 10 and the head element 300 in the installed state in a drum motor 1.

The rear flange 10 comprises a main body 110 and a cover element 200. An annular space 140 is configured between an axially and radially outer wall 112 of the main body 110 of the rear flange 10 and the cover element 200. The annular space 140 is disposed and configured for receiving a cable (not illustrated in FIGS. 1 to 5) having a liquid encapsulation (not illustrated in FIGS. 1 to 5). The cover element 200 on the axially inner end 210 thereof has a radially outward pointing protrusion 211, which engages in a corresponding clearance 113 on the axially and radially outer wall 112 of the main body 110 of the rear flange 10 and thus forms a form-fitting latching connection. The cover element 200 on the axially outer end has a substantially planar end face 220 that is spaced apart from the radially and axially inner elements of the head element 300. Only an outer wall 320 of the head element 300 partially overlaps the cover element 200 in the axial direction. It can be ensured in this way that an undesirable protrusion of the liquid encapsulation and/or of the cable portions disposed in the annular space 140 can be avoided in particular in the axial direction, such that undesirable contact with the head element 300 can be avoided.

An axially inner and radially outer wall 111 is recessed in a radially inward manner from the axially and radially outer wall 112 of the main body 110 of the rear flange, such that said axially inner and radially outer wall 111 can be introduced into an open end of a stator housing of a drive unit (not illustrated in FIGS. 1 to 5).

An axially and radially inner wall 132 of the main body 110 of the rear flange 10 is configured for receiving an intermediate tube 400. A rear axle 500 is connected to the main body 110 of the rear flange 10 by way of the intermediate tube 400. The rear axle 500 has an axially inner portion 510 and an axially outer portion 520 on which flattened regions 521 are disposed. The intermediate tube 400 also has an axially inner region 410, on which the radial opening 411 is configured, and an axially outer region 420.

A cable running in the annular space 140 can make its way into the interior of the intermediate tube 400 through the radial opening 411 of the intermediate tube 400. A cable can exit in the direction of the longitudinal axis X through an interior of the rear axle 500.

The head element 300 is mounted so as to be rotatable in relation to the rear axle 500 and the intermediate tube 400 by way of the bearing 330 having the bearing and sealing components 331, 332, 333 thereof. The head element 300 is preferably connected to a drum tube of a drum motor (not illustrated in FIGS. 1 to 5).

A drum motor 1 having a drum tube 2 having a cavity configured therein and a longitudinal axis X is illustrated in FIG. 6. An electric drive unit 3 and a gear unit 4 are disposed in the cavity of the drum tube 2. The head plate 300 which is mounted so as to be rotatable in relation to the rear axle 500 by way of the bearing 330 is disposed on the right end illustrated in FIG. 6. A further head plate 301 that is mounted so as to be rotatable in relation to the front axle 501 by way of the bearing 302 is disposed on the left end illustrated in FIG. 6. The drive unit 3 has a drive device that is disposed in a stator housing 11' and comprises a rotor or 31 and a stator 32.

The drive unit 3 by way of the gear unit 4 drives the drum tube 2 of the drum motor 1. The rear flange 10 is disposed on the right end of the drive unit 3 illustrated in FIG. 6, a cable 900 which exits axially through the interior of the intermediate tube 400 and the interior of the rear axle 500 can be disposed in the annular space 140 of said rear flange 10 that is formed between the main body 110 and the cover element 200.

Figure 7:
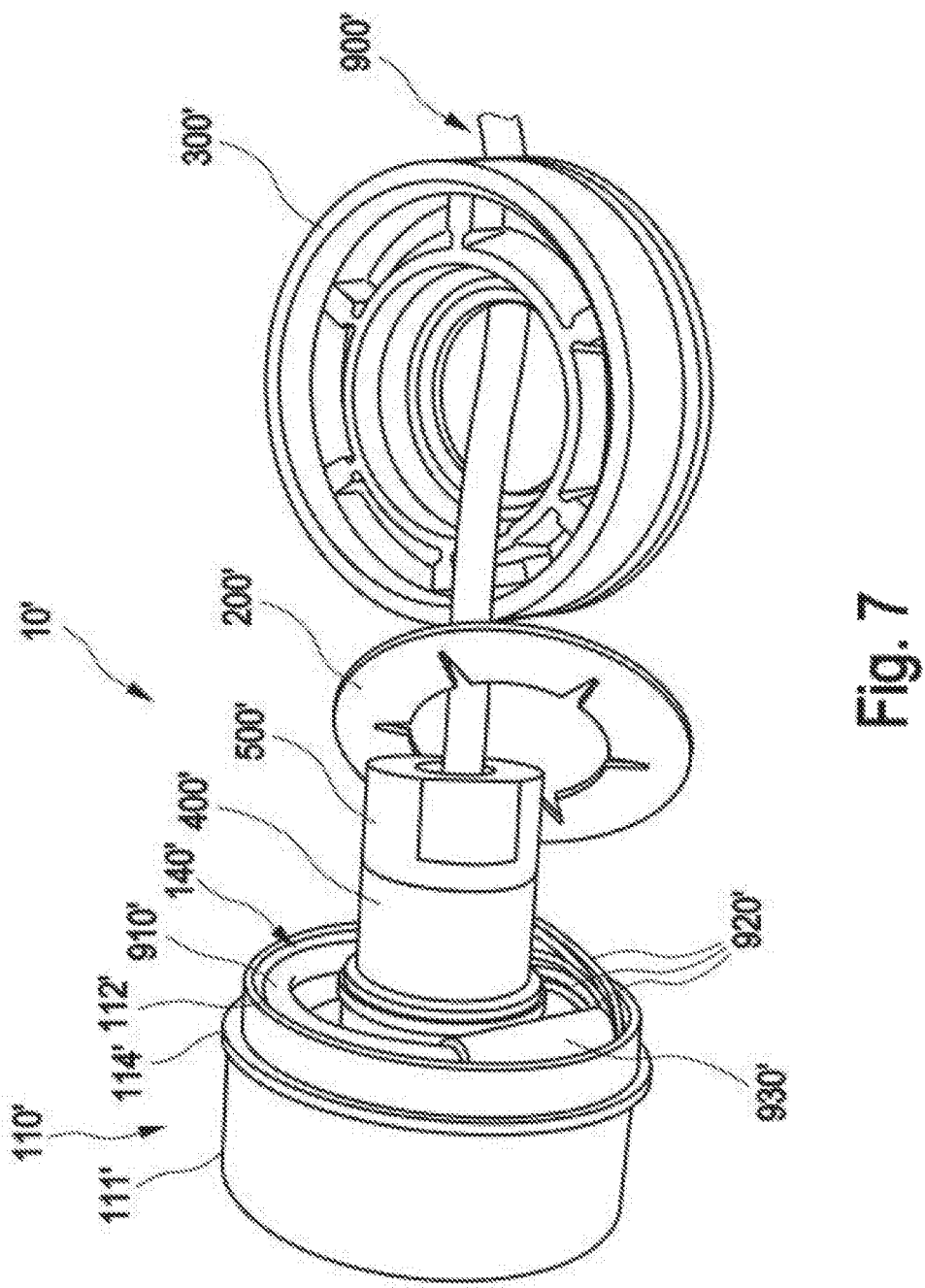
FIG. 7 is a further exemplary embodiment of a rear flange according to the invention, having a head element and a cable.

A rear flange 10' and a head element 300' and a cable 900' in a partially unassembled state are depicted in FIG. 7. The rear flange 10' has a main body 110' and a cover element 200'. The main body 110' has an annular space 140' that is delimited by a radially and axially outer wall 112' and is configured as a groove open at the end side, which can be closed by the cover element 200'. A rear axle 500' through which the cable 900' exits axially is connected to the rear flange 10' by way of an intermediate tube 400'. A radially outer and axially inner wall 111' is connected to the radially and axially outer wall 112' by way of a radially projecting ring 114'.

A cable is disposed in the annular space 140', the first portion of said cable in which the individual lines 920' are freely guided, and the second portion of said cable in which the individual lines are surrounded by a common jacket 910', being connected by a liquid encapsulation 930'. The liquid encapsulation 930' is disposed so as to be substantially completely within the annular space 140". Furthermore, a direction of main extent of the liquid encapsulation 930' in a central region of the liquid encapsulation 930' runs so as to be substantially tangential to the annular space 140'.

As can be seen specifically in FIGS. 2, 3, 6, and 7, a particularly compact construction mode having a small overall length (for example FW or EL, respectively, in FIG. 6) can be achieved by way of the disposal of the liquid encapsulation in the annular space so as to be orthogonal to the longitudinal axis X.

The invention claimed is:

1. An electric drive unit for a drum motor, comprising:
an electric drive device having a stator and a rotor, said stator and said rotor being disposed in a stator housing which extends along a longitudinal axis X;
a cable, wherein a first portion of the cable is connected to the electric drive device; and
a liquid encapsulation disposed on a second portion of the cable that has individual lines which are litz wires;
wherein a rear flange is disposed on one end of the stator housing, the rear flange comprising:
an annular space disposed on an end side thereof that in the operating state faces away from an interior of the stator housing and which is disposed and configured for receiving the liquid encapsulation of the cable that is connected to the electric drive device;
wherein the first portion of the cable is connected to the electric drive device, and the liquid encapsulation is disposed on the second portion of the cable that has individual lines which are litz wires and the liquid encapsulation is disposed in the annular space; and
wherein the end regions of the first and second portion of the cable that adjoin the liquid encapsulation are disposed in the annular space.

2. The drive unit pursuant to claim 1, wherein the first portion of the cable has individual lines which are litz wires.

3. The drive unit pursuant to claim 1, wherein the individual lines in any or both of the first portion and the second portion of the cable run in a mutually separate manner or the individual lines in any or both of the first portion or the second portion of the cable run in a common jacket.

4. The drive unit pursuant to claim 1, wherein a direction of main extent of the liquid encapsulation extends so as to be substantially parallel with the end side of the rear flange, such that the liquid encapsulation is disposed so as to be substantially completely within the annular space.

5. The drive unit pursuant to claim 1, wherein the annular space is delimited by an outer wall of the rear flange.

6. The drive unit pursuant to claim 1, wherein the annular space is configured as a groove that is open at the end side.

7. The drive unit pursuant to claim 1, wherein the annular space is delimited by a cover element.

8. The drive unit pursuant to claim 7, wherein the cover element at least in portions closes a groove of a main body of the rear flange, said groove being open at the end side.

9. The drive unit pursuant to claim 7, wherein the rear flange comprises metal, and wherein the cover element comprises a plastics material.

10. The drive unit pursuant to claim 1, further comprising:
a rear axle connected to the rear flange, wherein the cable runs through an interior of the rear axle.

11. The drive unit pursuant to claim 10, wherein the rear axle is connected to the rear flange by way of an intermediate tube, and the cable runs through an interior of the intermediate tube.

12. The drive unit pursuant to claim 11, wherein the intermediate tube or the rear axle has a radial opening which opens into the region of the annular space, and the cable runs out of the annular space through the radial opening of the intermediate tube or of the rear axle.

13. A drum motor comprising:
a drum tube having a cavity configured therein and a longitudinal axis X; and
an electric drive unit disposed in the cavity of the drum tube, the electric drive unit comprising:
an electric drive device having a stator and a rotor, said stator and said rotor being disposed in a stator housing which extends along the longitudinal axis X;
a cable, wherein a first portion of the cable is connected to the electric drive device; and
a liquid encapsulation disposed on a second portion of the cable that has individual lines which are litz wires;
wherein a rear flange is disposed on one end of the stator housing, the rear flange comprising:
an annular space disposed on an end side thereof that in the operating state faces away from an interior of the stator housing and which is disposed and configured for receiving the liquid encapsulation of the cable that is connected to the electric drive device, and
wherein the first portion of the cable is connected to the electric drive device, and the liquid encapsulation is disposed on the second portion of the cable that has individual lines which are litz wires and the liquid encapsulation is disposed in the annular space; and
wherein the end regions of the first and second portion of the cable that adjoin the liquid encapsulation are disposed in the annular space.

14. The drum motor pursuant to claim 13, wherein a head element comprising an introduction portion that is introduced into a hollow end of the drum tube, wherein the head element further comprises a radially outer wall that at least in portions overlaps the annular space of the rear flange in the direction of the longitudinal axis X of the stator housing.

15. The drum motor pursuant to claim 13, wherein a head element comprising an introduction portion that is introduced into a hollow end of the drum tube, wherein the head element further comprises a radially outer wall that at least in portions overlaps a cover element of the rear flange.

16. A method for producing a drum motor according to claim 13, wherein the method comprises the steps of:
    providing the drum tube having the cavity configured therein and the longitudinal axis; and
    disposing in the annular space in the cavity of the drum tube the electric drive unit;
    wherein the rear flange at an end side that faces away from the interior of the stator housing has the annular space disposed on one end of the stator housing, and the liquid encapsulation.

17. A method for producing an electric drive unit for a drum motor, the method comprising the steps of:
    providing an electric drive device having a stator and a rotor, said stator and said rotor being disposed in a stator housing which extends along a longitudinal axis, wherein a rear flange at an end side that faces away from an interior of the stator housing has an annular space disposed on one end of the stator housing;
    connecting a first portion of a cable to the electric drive device, wherein a liquid encapsulation is disposed on a second portion of the cable which has the individual lines which are litz wires; and
    disposing the liquid encapsulation in the annular space; and
    disposing the end regions of the first and second portions of the cable that adjoin the liquid encapsulation in the annular space.

\* \* \* \* \*